United States Patent Office 3,567,801
Patented Mar. 2, 1971

3,567,801
AMINOALKYL PHOSPHONATES
Walter Stamm, Tarrytown, and Silvio L. Giolito, Whitestone, N.Y., assignors to Stauffer Chemical Company, New York, N.Y.
No Drawing. Filed Nov. 3, 1967, Ser. No. 680,301
Int. Cl. C07f 9/40
U.S. Cl. 260—944
1 Claim

ABSTRACT OF THE DISCLOSURE

A composition of matter consisting of the reaction product of nitrogen containing alkylphosphonic acids and an alkylene oxide. The alkylene oxide can be selected from the group consisting of ethylene oxide, propylene oxide, butylene oxide, epichlorohydrin, 1,1,1-trichloropropylene oxide, styrene oxide, cyclohexene oxide, vinyl cyclohexene diepoxide and mixtures thereof. The compositions are useful as reactive flame retardants such as in the process of making polyurethane foam and can be used in mixtures or in lieu of polyalcohols.

BACKGROUND OF THE INVENTION

The production of urethane polymers is a well known commercial process, see for instance Kirk-Othmer, Encyclopedia of Chemical Technology, First Supplement, page 888 etc. (Interscience 1957). Briefly, this process involves the reaction of an isocyanate and a second compound which may contain a hydroxyl group, i.e., a compound containing active hydrogen. As used in this specification, the term "isocyanate material" is intended to include isocyanate or urethane compositions containing unreacted—NCO radicals.

The most common polymers are formed by reaction of toluene di-isocyanate and a diol or polyester. Representative polyesters are the reaction products of adipic acid and/or phthalic anhydride and ethylene glycol. Other compounds which may be used in place of the polyester are polyethers, simply glycols, polyglycols, castor oil, drying oils, etc. Whether the products are to be flexible or rigid depends upon the degree of crosslinking and thus the type of polyol which is used.

When an expanded or foamed product is to be produced, it is the general practice to add water to the composition. The water reacts with the —NCO group to release $CO_2$ and cause expansion of the polymer into a foamed mass. Control of this reaction requires considerable skill and often special equipment. In some cases it has been found advisable to use inert dissolved gases, including the various halohydrocarbons. These low boiling point liquids boil when warmed by the heat of the reaction and thus cause foaming. They also serve to lower the thermal conductivity and increase the flame resistance of the resulting foam. The term "foaming agent" as used herein is intended to include both reactive materials such as water and inert material such as the halohydrocarbons which cause the copolymers to form an expanded foam. In addition to the actual reactions and foaming agents, it is also desired in some cases to add a small amount of a surfactant in order to provide a more homogeneous mixture.

In the polyurethane field, increased interest is being shown in compounds which can be added to the polymers to act as fire retardant agents. Particular interest is being shown in compounds which have functional groups reactive with the polyol or the polyisocyanate used in preparing the polyurethane so that the fire retardant agent can be chemically incorporated into the polyurethane. Polyfunctional fire retardant agents are preferred in that they can copolymerize into the polymer chain and therefore act as a monomer in a similar manner to the other monomers used in forming the polyurethane. One group of compounds of this type is the hydroxyalkylaminoalkylphosphonates as set forth in U.S. patent to Beck et al., No. 3,076,010, issued Jan. 29, 1963. While this material exhibits fire retardancy to polyurethane foams, it has a relatively low phosphorus content and a relatively low hydroxy number which provides for only limited use of the compound.

BRIEF DESCRIPTION OF THE INVENTION

A new composition of matter has been discovered which is commercially significant and provides fire retardant properties in urethane foams. These new materials are nitrilotrisalkyl-, iminobisalkyl-, and aminoalkylphosphonate esters which can be combined with the reacting materials in urethane foam formulations to provide fire retardant properties to the end product. The composition of the present invention may replace a portion of or all of the polyols used in formulating the urethane foams when reacting the same with polyisocyanate materials. Also, the compositions of this invention can be used in formulating flame retardant polyesters.

DETAILED DESCRIPTION OF THE INVENTION

In the practice of the present invention, nitrogen containing alkylphosphonic acid is employed as a starting material to form the product of the present invention. These starting acids are well known chemicals that can be employed as a chelating agent or water softener or the like. They can be formulated by reacting phosphorous acid, aldehydes and ammonia or organic amines. The procedures used are well understood and documented in the art. In its preferred form, nitrilotrismethylphosphonic acids are used as the starting material, but it is to be understood that amino-methylphosphonic acids and imino-methylphosphonic acids can also be used as the starting materials. Also, the methylene moiety in the above acids can be alkyl substituted methylene groups such as, methyl methylene, dimethyl methylene, propyl methylene, butyl methylene.

The above mentioned acids, preferably nitrilotrismethylphosphonic acids, are reacted with alkylene oxides, preferably within an organic solvent such as benzene, toluene, xylene, dimethylacetamide, dimethyl formamide or the like, and then adding thereto the alkylene oxide at a suitable temperature with agitation until they have reacted. If desirable, a conventional catalyst system may be used in the reaction. The alkylene oxides that can be used with the present invention may be selected from the group consisting of ethylene oxide, propylene oxide, butylene oxide, epichlorohydrin, 1,1,1-trichloropropylene oxide, styrene oxide, cyclohexene oxide, vinyl cyclohexene diepoxide and mixtures thereof. The reaction products may be diluted with a suitable solvent and filtered to remove the unreacted methylphosphonic acids. The solvent may be removed with the end product being the alkoxylated methylphosphonic acid. The products formed have the following general formulas:

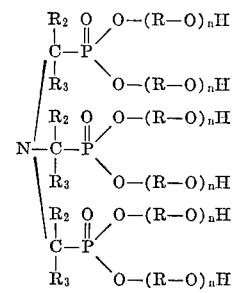

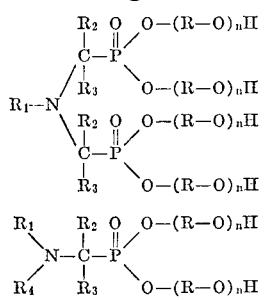

wherein R can be an alkylene or substituted alkylene group having from 2 to 12 carbon atoms, $R_1$ can be hydrogen, an alkyl group having from 1 to 18 carbon atoms, an aryl group or a substituted aryl group, $R_2$ and $R_3$ can be hydrogen or an alkyl group having from 1 to 4 carbon atoms, $R_4$ can be hydrogen, an alkyl group having from 1 to 18 carbon atoms, an aryl group or a substituted aryl group, and $n$ is a number from 0 to 12, wherein at least one $n$ is greater than zero.

The end products are soluble in most organic medias. These materials find utility in replacing a part of or all of the regular diols or polyols in the production of urethane foams in a conventional manner. For this purpose, the products are simply mixed with the diols or polyols in the regular formulations. Upon combination with polyisocyanates, they will react to form the phosphorus containing carbamates, which is the basis for the polyurethane foam.

The following examples are illustrative of the present invention:

Example 1

Fifty grams (0.167 mole) of nitrilotrismethylphosphonic acid was added to 100 milliliters of benzene to form a slurry. Ethylene oxide, in excess, was bubbled thru the mixture with agitation at 40 to 60° C. until the solids had reacted to form an oil. The material was diluted with ethanol, and filtered to remove the unreacted nitrilotrismethylphosphonic acid. The solvent benzene-alcohol was removed to give 80 grams of a viscous oil. Sixteen grams of solids were recovered after washing them with methanol. Analysis of this product showed an acid number of 0.604, hydroxyl number of 434, and a refractive index of 1.4895.

Example 2

Fifty grams of nitrilotrismethylphosphonic acid (0.167 mole) was added to 100 milliliters of benzene, followed by the addition of 75 grams of propylene oxide. The charge was heated on a water bath to 40 to 60° C., with mixing until the solids had reacted to give a viscous liquid. Additional benzene was added to dilute the charge and filtered to give 9 grams of insoluble material. This is equivalent to 82% conversion of the nitrilotrismethylphosphonic acid into a propyl oxylated oil. The solvent benzene was reduced on a Rotovac to give 100 grams of a light brown viscous oil. Analysis of this product indicated an acid number of 11.1 and a hydroxyl number of 377.8.

Example 3

An iminomethylphosphonic acid was formed by adding 82 grams, 1 mole, of phosphoric acid to a reaction vessel. The acid was heated to 60° C. Ethylene oxide was then added while the materials were agitated until an acid number of 4.0 was reached. Eighty-five grams of a 20% solution of ammonia (0.5 mole) was added to the mixture and cooled to 0° C. Then, 30 grams (1 mole) of a 37% solution of formaldehyde was added at such a rate to maintain a temperature of 10–20° C. The mixture was heated slowly to 60° C., then gradually to 95° C., and held there for one hour. The product was placed under an aspirator for water removal. The hydroxyalkyloxyalkyl aminomethyl phosphonate formed was analyzed and determined to have a hydroxyl number of 458.

Example 4

A polyurethane foam was formulated by admixing together the following components in a reaction vessel:

13.8 grams of the fire retardant material of Example 1,
46.5 grams of a commercial polyol defined as propyloxylated methyl glucoside,
0.9 gram of a conventional silicone surfactant,
0.7 gram dimethylethanolamine,
0.2 gram dibutyltin dilaurate,
21.0 grams of trichlorofluoromethane.

These materials were admixed together very thoroughly and then reacted with 66.9 grams of polymethylene polyphenylisocyanate. The polyurethane foam that resulted had a rise time of 70 seconds at a density of 2.08 pounds per cubic foot, and was tested according to the ASTM D–1692 method and was determined to be self-extinguishing.

Example 5

The procedure as set forth in Example 4 was repeated in its entirety except 13.2 grams of the fire retardant material of Example 2 were employed along with 47.4 grams of the polyalcohol of Example 4 and 66.6 grams of the isocyanate of Example 4. The resulting rigid foam had a density of 2.02 pounds per cubic foot and was tested according to ASTM D–1692 method and was determined to be self-extinguishing.

Example 6

The procedure as set forth in Example 4 was repeated in its entirety except the fire retardant material was used in lieu of the propyloxylated methyl glucoside which resulted in a total content of 60.3 grams of a fire retardant material therein. The resulting rigid urethane foam was tested and according to the ASTM D–1692 method was determined to be self-extinguishing.

Example 7

The procedure as set forth in Example 5 was repeated in its entirety except the fire retardant material was employed in place of the polyalcohol used in the formulation. Thus, the total amount of fire retardant material employed was 60.6 grams. The resulting rigid urethane foam was tested and found to be comparable to the urethane foam of Example 5.

Example 8

A polyurethane foam was formulated by admixing together the following components in a reaction vessel:

16.4 grams of the fire retardant material of Example 3,
23.2 grams of a commercial polyol defined as propyloxylated methyl glucoside,
0.5 gram of a conventional silicone surfactant,
0.8 gram dimethylethanolamine,
0.3 gram dibutyltin dilaurate,
14.0 grams of trichlorofluoromethane.

These materials were admixed together very thoroughly and then reacted with 45.3 grams of polymethylene polyphenylisocyanate. The polyurethane foam that resulted had a rise time of 60 seconds at a density of 1.96 pounds per cubic foot, and was tested according to the ASTM D–1692 method and was determined to be self-extinguishing.

What is claimed is:

1. A composition of matter having the formula:

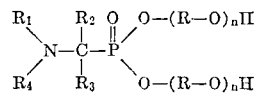

wherein R is selected from the group consisting of alkylene and chloro and phenyl substituted alkylene groups each having from 2 to 12 carbon atoms; $R_1$ and $R_4$ are hydrogen; $R_2$ and $R_3$ are selected from the group consisting of hydrogen and alkyl groups having from 1 to 4 carbon atoms; and $n$ is a number from 0 to 12, wherein at least one $n$ is greater than 0.

References Cited

UNITED STATES PATENTS

| 3,134,742 | 5/1964 | Wismer et al. | 260—945X |
| 3,257,479 | 6/1966 | Irani et al. | 260—932 |
| 3,457,333 | 7/1969 | Price | 260—945 |

FOREIGN PATENTS

| 1,474,920 | 2/1967 | France | 260—932 |

CHARLES B. PARKER, Primary Examiner

R. L. RAYMOND, Assistant Examiner

U.S. Cl. X.R.

260—2.5, 45.9, 77.5, 932, 945, 978, 984